(No Model.)

G. W. BEYER.
MANUFACTURE OF BALLS.

No. 263,466. Patented Aug. 29, 1882.

Witnesses:
T. J. Keane
James R. Bowen

Inventor:
George W. Beyer
By his Atty
Edwin H. Brown

UNITED STATES PATENT OFFICE.

GEORGE W. BEYER, OF BROOKLYN, NEW YORK, ASSIGNOR OF ONE-HALF TO FRANK ANDREWS, OF SAME PLACE.

MANUFACTURE OF BALLS.

SPECIFICATION forming part of Letters Patent No. 263,466, dated August 29, 1882.

Application filed July 12, 1882. (No model.)

*To all whom it may concern:*

Be it known that I, GEORGE W. BEYER, of Brooklyn, in Kings county, and the State of New York, have invented a certain new and useful Improvement in the Manufacture of Balls, of which the following is a specification.

My improvement relates to the manufacture of balls which are marked with numbers or other symbols, whereby they are distinguished from each other; and it particularly relates to the manufacture of the small balls which are used in playing "pool" to determine the order in which the players shall proceed. These balls are commonly made of plastic material and formed in molds. Various means have been devised for delineating their numbers upon them.

The object of my improvement is to provide for delineating the numbers upon them in such manner that they will not be readily effaced.

To this end the improvement consists in a method of making balls, consisting in inserting plastic material into a mold made internally of the form of a truncated cone, in placing marking material in a reverse prototype of the number to be marked on the ball, sunk into the bottom of the mold or into a bottom plate therefor, in placing over the plastic material a mold of a shape adapting it to form half the ball, in then subjecting the molds to pressure, in removing from the plastic material before it is set the mold which is of the form of a truncated cone and applying to it a mold of the form of half the ball to be produced, and in subjecting these molds to pressure. In this way I am enabled to mark the number upon a flat surface, and subsequently to complete the formation of the ball, and thereby to make a ball of one piece, homogeneous throughout, with the number indelibly delineated upon it.

Figure 1:
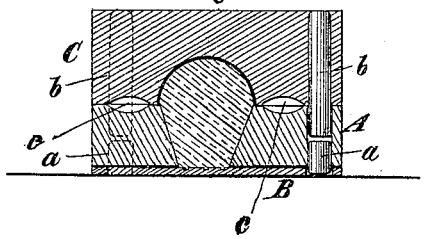
Figure 2:
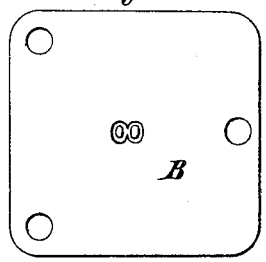
Figure 3:
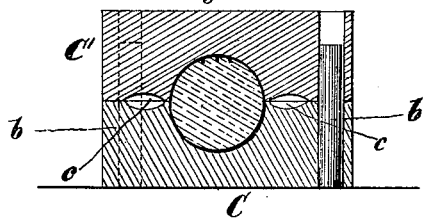

In the accompanying drawings, Figure 1 is a vertical section of the combination of molds wherein the plastic material receives its initial pressure for marking the ball. Fig. 2 is a top or face view of the bottom plate of the lower of these molds, and Fig. 3 is a vertical section of the combination of molds wherein the formation of the ball is completed.

Similar letters of reference designate corresponding parts in the several figures.

A designates a mold, which may be made of steel or other suitable material, and is internally of the shape of a truncated cone, or, in other words, a cone with the tip or apex removed. In this example of my invention this mold has a removable bottom plate, B, which may be made of the same material, and has in its face or top a sunken prototype, which is the reverse of the number to be delineated upon the ball. This prototype may be produced by engraving and is opposite the open bottom of the mold A. The bottom plate may be held in proper relation to the mold A by means of pins $a$ on the one fitting into corresponding recesses in the other. It is advantageous to employ a removable bottom plate, because the prototype may more easily and cheaply be produced in it, and also for the reason that any desired bottom plate may be used in conjunction with the same mold for producing balls differently marked. Marking material of a color contrasting with that used to form the ball, and of such nature that it will firmly adhere to the material which is used to form the ball, is inserted in the prototype of the bottom plate. Then a proper amount of the material used to form the ball is inserted in the mold A. I may here remark that the mold A is adapted to hold about one-half the material used to produce the ball. A mold, C, which is internally of the shape of half the ball to be produced, is then applied to the top of the mold B, and the molds, with the bottom plate in place, are then subjected to pressure. The proper relations between the molds may be preserved by means of pins $b$ on the one extending into corresponding recesses in the other. The plastic material used in forming the ball is then partly hemispherical, and the remainder of a conoidal form, with a flat end upon which is a raised delineation of the number desired to be marked on the ball. The mold A and its bottom plate, B, are removed before the material has set, and a mold, C', which corresponds to or is the counterpart of the mold C, is then applied to the conoidal portion of the material. The proper relation between these molds may be preserved by the pins $b$ on the mold C fitting in corresponding recesses in the mold C'. The molds are now subjected to pressure, the ball is formed, and the number impressed into and firmly embedded in it. The ball thus produced is made of one piece of material and is homogeneous throughout. The various combinations of molds may be subjected to pressure in a press or otherwise. Any surplus material is accommodated in annular grooves c, provided in the faces of the molds, and may afterward be removed.

The plastic material may be such as is now commonly used for forming balls.

The marking material may be made of any suitable ingredients. That which I use is the same material as that of which the balls are made, with the addition of lamp-black.

The molds may, if desirable, be used in the reverse order; or, in other words, those described as used undermost may be arranged uppermost. Indeed, they may all be used on their sides, if preferable.

What I claim as my invention, and desire to secure by Letters Patent, is—

The method of making balls, consisting in inserting plastic material into a mold made internally of the form of a truncated cone, in placing marking material in a reverse prototype of the number to be marked on the balls, sunk into the bottom of the mold or into a bottom plate therefor, in placing over the plastic material a mold of a shape adapting it to form half the ball, in then subjecting the molds to pressure, in removing from the plastic material before it is set the mold which is of the form of a truncated cone and applying to it a mold of the form of half the ball to be produced, and in subjecting these molds to pressure, substantially as specified.

GEO. W. BEYER.

Witnesses:
T. J. KEANE,
JAMES R. BOWEN.